United States Patent
Rameshni

(10) Patent No.: US 8,377,402 B2
(45) Date of Patent: Feb. 19, 2013

(54) AMMONIA DESTRUCTION METHODS FOR USE IN A CLAUS TAIL GAS TREATING UNIT

(75) Inventor: Mahin Rameshni, Arcadia, CA (US)

(73) Assignee: WorleyParsons Group, Inc., Arcadia, CA (US)

( * ) Notice: Subject to any disclaimer, the term of this patent is extended or adjusted under 35 U.S.C. 154(b) by 632 days.

(21) Appl. No.: 12/098,080

(22) Filed: Apr. 4, 2008

(65) Prior Publication Data

US 2008/0247927 A1    Oct. 9, 2008

Related U.S. Application Data

(60) Provisional application No. 60/910,074, filed on Apr. 4, 2007.

(51) Int. Cl.
*B01D 53/34* (2006.01)
*C01C 1/00* (2006.01)
*C01B 17/00* (2006.01)

(52) U.S. Cl. .................. 423/237; 423/573.1; 423/352

(58) Field of Classification Search .................. None
See application file for complete search history.

(56) References Cited

U.S. PATENT DOCUMENTS

| | | | |
|---|---|---|---|
| 3,895,101 A | | 7/1975 | Tsuruta |
| 4,123,507 A | * | 10/1978 | Hass .................. 423/574.1 |
| 4,778,490 A | | 10/1988 | Pollert |
| 4,780,305 A | | 10/1988 | Steppe |
| 5,139,765 A | | 8/1992 | Szekely |
| 5,294,428 A | | 3/1994 | Watson |
| 5,352,433 A | | 10/1994 | Watson |
| 5,468,458 A | | 11/1995 | Watson |
| 5,486,345 A | | 1/1996 | Watson |
| 5,672,326 A | | 9/1997 | Minak et al. |

(Continued)

FOREIGN PATENT DOCUMENTS

| | | |
|---|---|---|
| EP | 0140573 A2 | 8/1985 |
| WO | 2005007570 | 1/2005 |

(Continued)

OTHER PUBLICATIONS

International Search Report for Corresponding International Patent Application No. PCT/US2008/059455.

(Continued)

*Primary Examiner* — Melvin C Mayes
*Assistant Examiner* — Sheng H Davis
(74) *Attorney, Agent, or Firm* — Osha • Liang LLP

(57) ABSTRACT

Oxidative and reductive methods are described for the cost-effective destruction of an ammonia-bearing gas stream, potentially containing minor but significant quantities of hydrogen sulfide ($H_2S$), in a conventional Claus sulfur recovery tail gas treating unit, using controlled rates and compositions of combustion gases in order to obtain the temperatures necessary for the desired destruction of unwanted combustibles. In accordance with the present disclosure, a reductive method for the destruction of ammonia in a Claus tail gas treating unit is described, wherein the method includes introducing an ammonia-containing gas stream into a first combustion zone of a reactor in combination with a first oxygen-containing air stream to generate a first combustion gas stream composition; introducing a hydrocarbon-containing fuel gas stream and a second oxygen-containing air stream into a second combustion zone of the reactor to generate a second combustion gas stream composition; combining the first and second combustion gas stream compositions in a waste heat boiler to generate a waste effluent gas; contacting the waste effluent gas with a Claus tail gas stream to produce a primary waste stream; and contacting the primary waste stream with a hydrogenation catalyst system for a period of time sufficient to reduce $NO_x$ in the primary waste stream to ammonia.

3 Claims, 2 Drawing Sheets

U.S. PATENT DOCUMENTS

| | | | |
|---|---|---|---|
| 5,904,910 | A | 5/1999 | Stevens et al. |
| 6,287,535 | B1 | 9/2001 | Schendel |
| 6,890,498 | B2 | 5/2005 | Tsiava et al. |
| 6,893,620 | B2 | 5/2005 | Watson et al. |
| 6,902,713 | B1 | 6/2005 | Binoist et al. |
| 6,919,059 | B2 | 7/2005 | Watson et al. |
| 7,250,149 | B1 * | 7/2007 | Smith ................ 423/573.1 |
| 7,544,344 | B2 | 6/2009 | Graville |
| 2007/0134147 | A1 | 6/2007 | Graville |

FOREIGN PATENT DOCUMENTS

| | | | |
|---|---|---|---|
| WO | WO 2005/007570 | * | 1/2005 |
| WO | 2005049487 | | 6/2005 |
| WO | 2006103754 | | 10/2006 |

OTHER PUBLICATIONS

Written Opinion for Corresponding International Patent Application No. PCT/US2008/059455.

Phillips, J. "Control and Pollution Prevention Options for Ammonia Emissions." Control Technology Center, U.S. Environmental Protection Agency, Apr. 1995, North Carolina.

Shell Global Solutions. "Shell Claus off-gas treatment process." Royal Dutch/Shell Group, [retrieved from the Internet on Jul. 14, 2008 using <URL: http://www.shell.com/static//globalsolutions-en/downloads/industries/gas_and_lng/brochures/claus_off-gas_treatment.pdf>].

Pearson, M. "Claus catalyst management." A Technology White Paper, Feb. 2006, Engelhard Corporation, United States.

Mehta, M., Ward, C. and Weber, B. "Beating the Clock." Hydrocarbon Engineering, Palladian Publications, Apr. 2004, pp. 57-60.

Kilian, M. and Wozny, G. "Maximising Claus Plant Efficiency." Hydrocarbon Engineering, Palladian Publications, Sep. 2002.

McIntyre, G. and Lyddon, L. "Claus Sulphur Recovery Options." Petroleum Technology Quarterly Spring 1997, pp. 57-61, Bryan Research & Engineering, Inc., Texas.

Rameshni, M. "Selection Criteria for Claus Tail Gas Treating Processes." Sulphur (magazine), 2008.

Rameshni, M. "Ammonia Destruction in a Claus Tail Gas Treating Unit: RAC (Rameshni Ammonia Combustion)." presented at 2007 British Sulphur Conference, Canada, [retrieved from the Internet on Jul. 14, 2008 using <URL: http://www.worleyparsons.com/v5/download.aspx?file=Ammonia_Destruction_in_a_Claus_Tail_Gas_Treating_Unit.pdf>].

British Sulphur Events. "Sulphur 2007." 23rd Sulphur International Conference and Exhibition (Brochure), Oct. 28-31, 2007, Montreal, Canada.

Examination Report under Section 18(3) dated Aug. 28, 2012 in corresponding GB application No. GB0199281.6 (2 pages).

* cited by examiner

AMMONIA DESTRUCTION METHODS FOR USE IN A CLAUS TAIL GAS TREATING UNIT

CROSS REFERENCE TO RELATED APPLICATIONS

The present application claims priority to U.S. Provisional Patent Application Ser. No. 60/910,074, filed Apr. 4, 2007, the contents of which are incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

This disclosure relates generally to methods for the destruction of unwanted byproducts in tail gas treating units, and more particularly, to methods for the destruction of byproduct ammonia gas in Claus tail gas treating units associated with Claus reactor units.

2. Description of the Related Art

The "modified Claus" process is commonly employed for the recovery of elemental sulfur from byproduct hydrogen sulfide ($H_2S$) gas produced in various industrial sectors, most notably natural gas production and petroleum refining. This recovered elemental sulfur may be used in a variety of applications, including the production of sulfuric acid. Conversion from byproduct hydrogen sulfide generally begins with a controlled combustion with oxygen ($O_2$), typically as air, in which approximately ⅓ of the $H_2S$ is oxidized to sulfur dioxide ($SO_2$), as illustrated in equation (1):

$$H_2S + 3/2 O_2 \rightarrow SO_2 + H_2O + \Delta H \text{ [combustion]} \quad (1)$$

The $SO_2$ so generated then reacts with the remaining hydrogen sulfide ($H_2S$) to form sulfur and water vapor according to the Claus reaction as shown in equation (2):

$$2H_2S + SO_2 \rightarrow 3S + 2H_2O + \Delta H \quad (2)$$

In summation, the net overall reaction for the recovery of elemental sulfur from by-product hydrogen sulfide ($H_2S$) may be described as shown in equation (3), below.

Roughly half of the sulfur produced in such a manner is formed in the reaction furnace, with the balance typically being generated by continuation of reaction (2) in one or more downstream catalytic stages.

$$3H_2S + 3/2 O_2 \rightarrow 3S + 3H_2O + \Delta H \quad (3)$$

The refining processes conducive to formation of byproduct $H_2S$ from more complex organic sulfur compounds also tend to convert nitrogen compounds to ammonia ($NH_3$). Subsequent recovery of the $NH_3$ will typically yield a roughly equimolar gaseous mixture of $NH_3$ and $H_2S$ (and water), which usually can be conveniently fed to the Claus reaction furnace in combination with a larger $H_2S$ stream containing negligible $NH_3$. The $NH_3$ is ostensibly oxidized as shown in equation (4).

$$2NH_3 + 3/2 O_2 \rightarrow N_2 + 3H_2O + \Delta H \quad (4)$$

However, since the oxygen ($O_2$) used is nominally limited to that required for oxidation of only ⅓ of the hydrogen sulfide, the hydrogen sulfide and ammonia are in competition for the available $O_2$ such that initial $SO_2$ generation likely exceeds that required by the Claus stoichiometry, and much of the ammonia is subsequently oxidized to generate nitrogen gas and water by reaction with $SO_2$ as shown in equation (5).

$$4NH_3 + 3SO_2 \rightarrow 2N_2 + 6H_2O + 1.5S_2 \text{ [conversion]} \quad (5)$$

In Claus reactions, exactly one third of the feed sulfur must be oxidized to $SO_2$, requiring close control of the supply of oxygen in excess of that consumed by other reactions, including the combustion of hydrocarbons and ammonia. Fluctuations in the rate of ammonia addition into the feed may therefore have an unwanted, disproportionate effect upon the oxygen demand. Clearly then, the amount of vapors containing ammonia and hydrogen sulfide which can be treated in this manner is limited, and it is generally accepted that the maximum amount of ammonia ($NH_3$) that can be so processed is about 30-35% of the total Claus feed, on a wet basis. Several processes for the treatment of vapors containing ammonia and hydrogen sulfide so as to address these issues and limitations are known and have been described in the art.

For example, a unique furnace design, which permits the combustion of proportionately greater amounts of $NH_3$, has been described in U.S. Pat. No. 5,904,910. This patent suggests a method for producing hydrogen and sulfur from a first gaseous mixture containing hydrogen sulfide and ammonia by separating ammonia from the first gaseous mixture to produce a second gaseous mixture containing hydrogen sulfide; combusting a portion of the hydrogen sulfide in the second gaseous mixture to produce a third gaseous mixture containing hydrogen sulfide and sulfur dioxide; heating the ammonia to a temperature of at least 1800° F. to produce a fourth gaseous mixture containing nitrogen and hydrogen; and, combining the third gaseous mixture and the fourth gaseous mixture and passing the combined gaseous mixture to a sulfur recovery process wherein the hydrogen sulfide and sulfur dioxide are recovered as sulfur. The ammonia may be partially oxidized by the use of substoichiometric amounts of oxygen or thermally dissociated. Other options which have been suggested for addressing this problem include conversion of the $NH_3$-bearing stream to ammonium thiosulfate fertilizer, and purification of the $NH_3$ for marketing as a byproduct or incineration.

Other approaches in addressing this problem have included the controlled injection of gas injections into a Claus furnace using parallel injections and injection speeds, using modified catalysts, using gas permeable membranes and specialized treatment solutions, and using sensors such as laser diodes at the outlet of a Claus furnace in order to control the flow rate of gasses and minimize the amount of oxygen-rich gas required by the process. More recently, approaches using specialized burner designs having specific tube orientations and diameters in order to at least partially oxidize gas streams comprising hydrogen sulfide and ammonia, such as described in U.S. Pat. No. 6,890,498 to Tsiava, et al.

In view of these problems with the production and control of ammonia during Claus productions, improved methods for the clean, safe and efficient destruction of ammonia in tail gas treating units are necessary. This application for patent discloses methods for the efficient and environmentally favorable treatment of vapors which contain ammonia for the destruction of the ammonia in Claus tail gas treating units.

BRIEF SUMMARY OF THE INVENTION

In accordance with the present disclosure, the present disclosure provides methods for the efficient treatment and destruction of ammonia in Claus tail gas treating units. In accordance with one embodiment of the present disclosure, a reductive method for the destruction of ammonia in a Claus tail gas treating unit is described, wherein the method comprises introducing an ammonia-containing gas stream into a first combustion zone of a reactor in combination with a first oxygen-containing air stream to generate a first combustion gas stream composition; introducing a hydrocarbon-containing fuel gas stream and a second oxygen-containing air stream into a second combustion zone of the reactor to generate a second combustion gas stream composition; combining the first and second combustion gas stream compositions in a waste heat boiler to generate a waste effluent gas; contacting the waste effluent gas with a Claus tail gas stream to produce a primary waste stream; and contacting the primary waste stream with a hydrogenation catalyst system for a period of time sufficient to reduce $NO_x$ in the primary waste stream to ammonia.

In accordance with a separate embodiment of the present disclosure, an oxidative method for the destruction of ammonia in a Claus tail gas treating unit is described, the method comprising introducing an ammonia-containing gas stream into a first combustion zone of a reactor in combination with a first oxygen-containing air stream to generate a first combustion gas composition; introducing a hydrocarbon-containing fuel gas stream and a second oxygen-containing air stream into a second combustion zone of the reactor to generate a second combustion gas composition; combining the combustion gases in a third combustion zone of the reactor to generate a third combustion gas composition; and combining the third combustion gas composition with a Claus tail gas stream in a fourth combustion zone of a reactor to generate a reaction temperature capable of thermally oxidizing combustibles within the fourth combustion zone.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
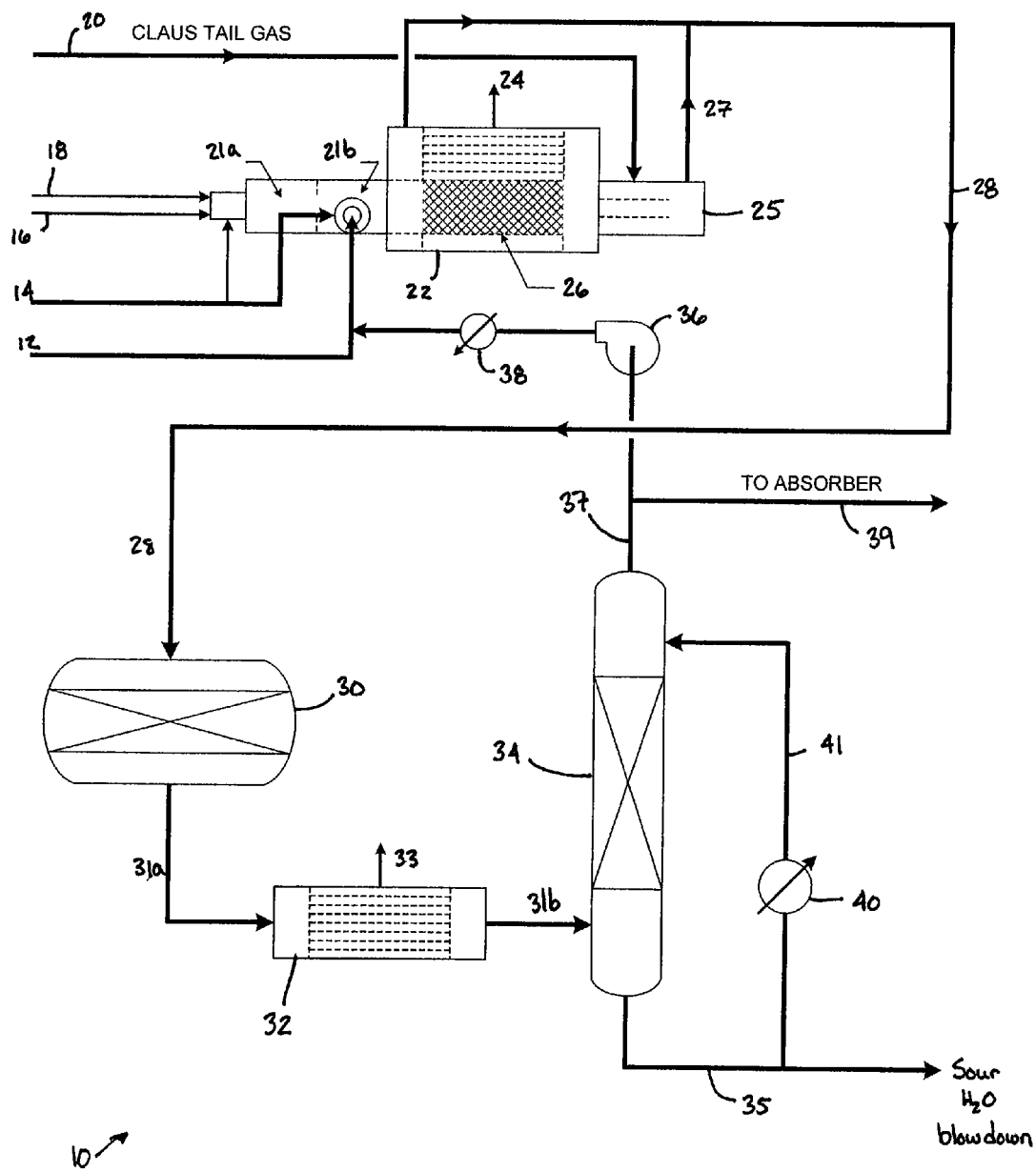
FIG. 1 is a schematic diagram illustrating the destruction of byproduct $NH_3$ in a typical reductive Claus tail gas treating unit.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

Definitions

The following definitions are provided in order to aid those skilled in the art in understanding the detailed description of the present invention.

The term "nitrogen oxide" ($NO_x$), as used herein, refers to any of the various nitrogen oxides produced during combustion processes, including but not limited to nitric oxide (NO), nitrogen dioxide ($NO_2$), nitrous oxide ($N_2O$), dinitrogen trioxide ($N_2O_3$), dinitrogen tetroxide ($N_2O_4$), and dinitrogen pentoxide ($N_2O_5$). The general term $NO_x$ may be used to mean the total concentration of NO plus $NO_2$, as appropriate.

As used herein, the term "air" refers generally to the mixture of gases surrounding the earth's atmosphere, comprising nitrogen, oxygen, argon, carbon dioxide, helium, neon, hydrogen, and methane, in varied amounts.

As used herein, the term "gas rich in oxygen" refers to air which has been enriched in its oxygen content, such that the oxygen content is greater than about 25 molar percent (mol %), up to about 100 mol %, as well as oxygen contents having mol % values between such values, wherein such a gas enriched to contain 100 mol % oxygen corresponds to pure oxygen gas. The content of oxygen in which the gas enriched in oxygen corresponds to the molar fraction of oxygen in the enriched gas. For example, air that has been enriched in oxygen to 50% consists of a gas mixture comprising 50 molar percent oxygen.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

In general terms, Applicants have created an ammonia combustion system in order to substantially destroy the ammonia in Claus reactor waste streams, and in so doing minimize nitrogen oxide ($NO_x$) formation while simultaneously maximizing hydrogen gas ($H_2$) production. The presently described systems, which are alternatively oxidative or reductive, uniquely integrate ammonia combustion with the tail gas treating unit (TGU) feed preheating step, and simultaneously controls and optimizes the air/$NH_3$ ratio in order to minimize $NO_x$ and maximize $H_2$ by virtue of accepting incomplete $NH_3$ destruction.

In the context of the present disclosure, the use of the term "reductive" in association with the ammonia destruction processes described herein refers to the general class of tail gas treating units (TGU), wherein all non-$H_2S$ sulfur compounds are reduced to $H_2S$. This is in contrast to an "oxidative" TGU whereby all non-$SO_2$ sulfur compounds are oxidized to $SO_2$.

For units processing substantial amounts of ammonia ($NH_3$), Claus sulfur recovery efficiency is typically <95% and secondary treatment may often be necessary in order to meet emission limits. There are fundamentally two types of Claus tail gas treating units (TGUs) which can be used—reductive TGUs and oxidative TGUs.

The most prevalent are reductive units, which catalytically convert virtually all non-$H_2S$ sulfur compounds and elemental sulfur vapor ($S_x$) to $H_2S$ for (1) subsequent absorption in a regenerable solution, typically an alkanolamine, for recycle to the Claus unit, or (2) precipitation of elemental sulfur particles in a redox process.

Oxidative TGUs thermally oxidize all sulfur compounds and $S_x$ to $SO_2$ for subsequent absorption in a regenerable solution for recycle to the Claus unit.

In conventional Reducing Gas Generator (RGG) processes, the tail gas from the final condensers of the sulfur recovery units enters the hydrogenation section through the Reducing Gas Generator. The reducing gas generator has the dual purpose of heating the tail gas to a temperature that will permit the desired hydrogenation and hydrolysis reactions to proceed in the reactor and to supply reducing gases, $H_2$ and CO, to supplement those present in the tail gas. These functions are carried out by the combustion of natural gas with air supplied by the RGG combustion air blower at substoichiometric conditions. Hot combustion products are mixed with the tail gas, and the resulting stream flows to the hydrogenation reactor.

In the hydrogenation reactor, sulfur compounds are converted to $H_2S$ by the hydrogenation and hydrolysis reactions described above. These reactions are exothermic creating a temperature rise across the catalyst bed.

Turning now to the figures, and particularly FIG. 1, in methods for the destruction of ammonia in a reductive Claus tail gas treating unit (TGU), a general reductive method using a standard TGU system (10) is illustrated in FIG. 1. As shown therein, a byproduct $NH_3$ gas stream (12), potentially containing minor but significant concentrations of $H_2S$, mercaptans, HCN, hydrocarbons and unspecified organic contaminants is combusted sub-stoichiometrically with a stream of air (14) in waste heat boiler (22) to generate usable heat, e.g., as steam (24) and hydrogen ($H_2$) gas. In a preferred embodiment, an auxiliary fuel stream (16) comprising at least one hydrocarbon, such as natural gas for example, is also introduced into waste heat boiler (22) and combusted to the extent potentially necessary to satisfy downstream process demand for heat and $H_2$, where said auxiliary fuel is preferably combusted in zone 1 (21a) of the combustion chamber, and the $NH_3$ gas is combusted in downstream zone 2 (21b). A stream of steam (18), typically proportional to the quantity of said auxiliary fuel stream (16), is optionally injected into the zone 1 (21a) burner as may be warranted for purposes of soot inhibition and/or temperature moderation, particularly when necessary to rely on the combustion of said auxiliary fuel stream (16) for generation of heat and hydrogen gas ($H_2$) in the temporary absence of said byproduct $NH_3$ as stream (12). In passing through the waste heat boiler, the combined gas stream, comprising the combusted auxiliary fuel (16) and the ammonia-gas (12) may be optionally passed over or contacted with an ammonia ($NH_3$) cracking catalyst 26 before proceeding to the tail end (25) of the boiler. Further, combustion air or $O_2$ of the auxiliary fuel may be sub-substoichiometric, stoichiometric or super-stoichiometric, realizing that super-stoichiometric combustion may not be generally advisable in all instances, especially in the absence of downstream $NH_3$ combustion.

The combined combustion gases are subsequently combined with the Claus tail gas (20) at the tail end (25) of boiler (22) to achieve a net combustion temperature ranging from about 550° F. (about 288° C.) to about 650° F. (about 343° C.). Following the combination of the combustion gas stream from the boiler (22) with the Claus tail gas stream (20), the waste stream (28) is typically passed through a hydrogenation reactor (30) or the like containing an appropriate catalyst system, such as a fixed bed of alumina catalyst which has been impregnated with oxides of cobalt or nickel and molybdenum.

The catalyst system serves to hydrogenate $SO_2$ and $S_x$ vapor to $H_2S$, hydrolyze COS and $CS_2$ to $H_2S$, hydrolyze CO to $CO_2$ and $H_2$, and reduce $NO_x$ to $NH_3$. From hydrogenation reactor (30), the reduced tail gas stream (31a) proceeds through waste heat boiler (32), wherein steam (33) is released, and which may be utilized as usable heat.

The approach to stoichiometric air for the combustion of the $NH_3$, and potentially the auxiliary fuel, is limited as necessary to generate sufficient $H_2$ for complete hydrogenation of $SO_2$ and $S_x$ to $H_2S$. Consistent with established practice, a typical residual $H_2$ concentration of from about 1% to about 3% on a dry, molar basis is maintained downstream of the reactor.

From waste heat boiler (32), the reactor effluent gas (31b), nominally comprised of about ⅓ water vapor, is transferred to a contact condenser (34) and optionally directed to a sour water treatment facility, cooled, and/or passed through condenser (34) and passed through $H_2S$ enrichment blower (36) and reheater (38) before being re-introduced into the ammonia-gas stream (12) being introduced to the reductive system (10). In the event that reactor effluent gas stream (31b) is cooled in contact condenser (34), the cooling may be achieved by optionally cooling to a first temperature ranging from about 300° F. (about 149° C.) to about 350° F. (about 177° C.) by indirect waste heat steam generation, then reduced further to a second temperature ranging from about 80° F. (about 27° C.) to about 100° F. (about 38° C.) by direct contact with a recycle water stream (41) in the contact condenser (34), which also serves to condense most of the water vapor and absorb substantially all of any remaining $NH_3$ which may be present. Surplus recycle water (35) may be continuously purged to the plant's sour water blowdown collection system.

The cooled, relatively dry gas is then typically contacted with a suitable absorption medium for recovery of a majority (greater than about 75%) of the $H_2S$. In the common case where the absorption medium is an alkanolamine solution (or the like), for example, any $NH_3$ not absorbed in the contact condenser (34) will be absorbed by the amine and ultimately concentrated in the regenerator reflux (40), a slipstream of which can be purged to sour water if necessary in order to avoid excessive buildup.

Figure 2:
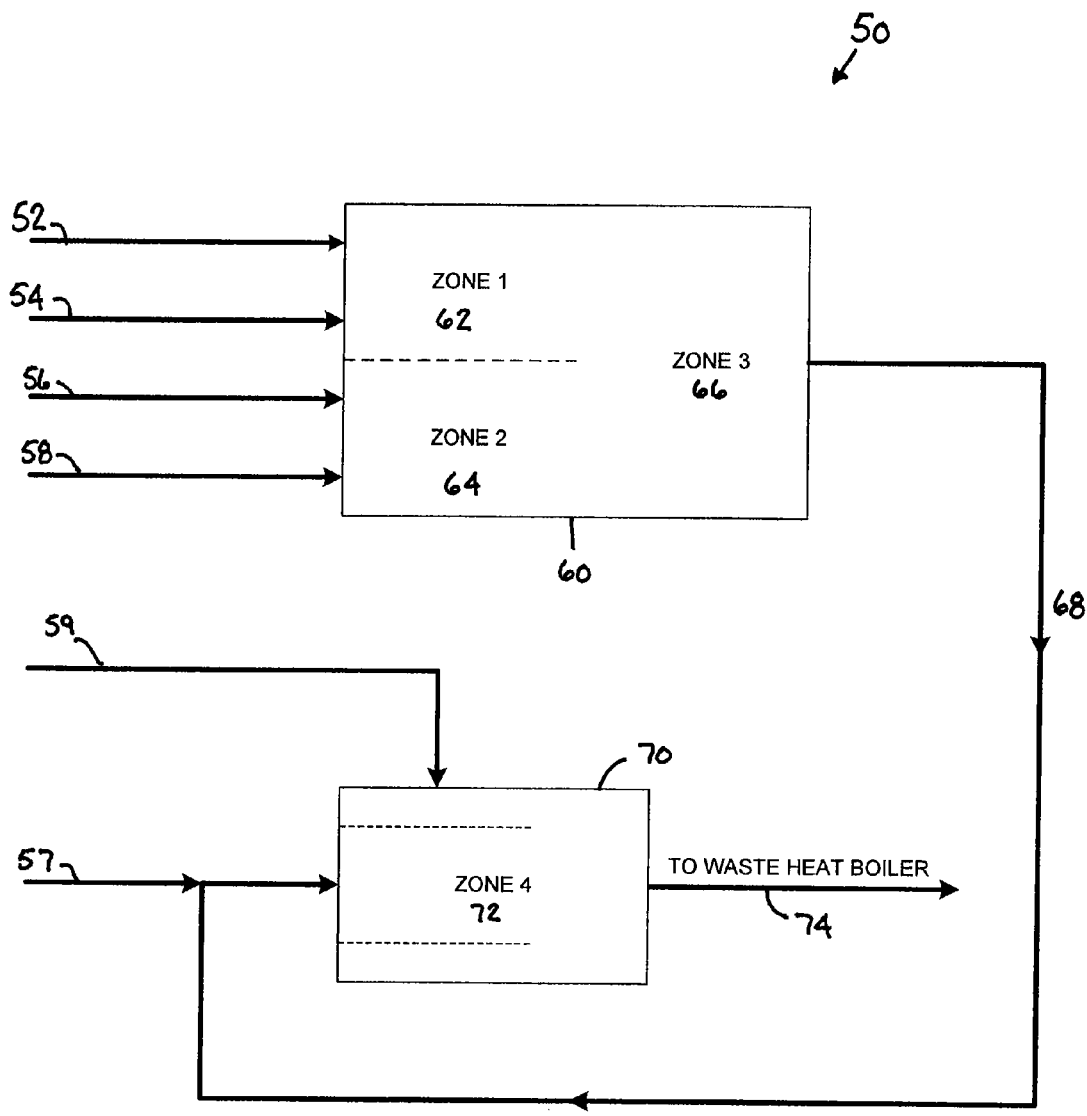
FIG. 2 is a schematic diagram illustrating the destruction of byproduct $NH_3$ in a typical oxidative Claus tail gas treating unit.

An alternative and equally acceptable method of destroying excess ammonia from Claus processes is by an oxidative method, using a system (50) as illustrated generally in FIG. 2. As shown therein, in an oxidative treating gas unit (TGU) 50 (FIG. 2), the aforementioned byproduct ammonia gas ($NH_3$) stream (56) is combusted sub-stoichiometrically in a first zone, e.g., zone 1 (62), of a reactor (60), in the presence of an air/oxygen stream (58). During the reaction in zone 1 (62), the air/gas ratio may be automatically adjusted as necessary in order to achieve a residual hydrogen ($H_2$) concentration that is sufficient to ensure that $NO_x$ formation is minimized.

Simultaneously, and in accordance with this aspect of the disclosure, supplemental fuel gas (52), typically a hydrocarbon gas or refinery fuel gas, is combusted with excess air or oxygen-enriched air stream (54) in a second zone, e.g., zone 2 (64), in the reactor (60) to the extent necessary to achieve the desired downstream temperature of the Claus tail gas. When no supplemental heat is required, a minimum standby fire is preferably maintained within the appropriate zone(s) (i.e., zone 2) of the reactor (60) so that the firing rate can be promptly increased in the event of $NH_3$ gas curtailment.

Following the initial combustion steps, the combustion gases from the first and second zones in the reactor (60) (zone 1 (62) and zone 2 (64)) are combined in a third reaction zone, zone 3 (66) of reactor (60), wherein residual hydrogen gas ($H_2$) and potential CO (carbon monoxide), $H_2S$ (hydrogen sulfide) and other miscellaneous combustibles can be thermally oxidized by excess $O_2$ from zone 2 (64).

With continued reference to FIG. 2, following the combination in the third reaction zone, zone 3 (66), combustion effluent gases (68) exit reactor (60) and are then combined with the Claus tail gas stream (59) in a fourth zone, zone 4 (72), for a duration sufficient to achieve the net average temperature necessary for the desired oxidation of combustibles within the stream, which will typically include, but is not limited to, $H_2S$, $S_x$, COS, $CS_2$ and CO. In accordance with the present disclosure, this fourth zone, zone 4 (72), may be in a separate reactor (70) as illustrated, or may optionally and equally acceptably be contained within a separate zone of the first reactor (60) which contains the first three zones, zones 1, 2 and 3. The temperature required for this thermal oxidation step in the fourth zone, zone 4 (72), will typically range from about 800° F. (about 427° C.) to about 2000° F. (about 1093.3° C.), and more typically from about 800° F. (about 427° C.) to about 1500° F. (about 815.5° C.), depending on prevailing environmental regulations, residence time and the nature and concentration of key combustibles. If necessary, additional combustion air (not shown) may be injected to supplement residual oxygen in the third reaction zone, zone 3 (66), effluent. In accordance with certain aspects of the present disclosure, a typical target would be from about 1 mol. % to about 5 mol. % residual $O_2$ on a molar wet basis, and more typically from about 1 mol. % to about 3 mol % residual $O_2$ on a molar wet basis in the combined tail gas stream. The effluent stream (74), upon leaving zone 4 (72) may then be directed as desired, such as to a waste heat boiler (not shown) or a similar assembly.

Destruction of ammonia in a two-zone thermal reactor such as shown in FIG. 2 requires proper distribution of sulfur between the first chamber in the thermal reactor and the second. Too little hydrogen sulfide in the first chamber allows for the generation of high temperatures that produce unwanted $SO_3$, which can deposit in or on the Claus catalyst. Conversely, too much hydrogen sulfide to the first chamber can prevent the oxidizing atmosphere required for complete destruction of the ammonia. The residual ammonia may then be deposited in or on the catalyst. Low residual oxidizing potential also deposits coke in the reactors. The life of the Claus catalyst is shortened whenever the air rate is either above or below optimum.

The process gas leaving the hydrogenation reactor may be subjected to further processing. In a preferred embodiment of the invention, the cooled process gas in the hydrogenation reactor is brought into contact with a hydrogenation catalyst. The hydrogenated process gas can be subjected to a selective absorption process thereby removing the hydrogen sulfide from the process gas.

Catalysts

Catalysts which are suitable for the minimization of $NO_x$, maximization of $NH_3$ conversion, and/or maximization of hydrogen gas ($H_2$) yield, as well as ammonia splitting and/or hydrogenation are known and, in the case of the ammonia-cracking catalyst, will be catalysts which will permit the partial oxidation process at lower air/gas ratios. Such catalysts are generally well known in the art and can include nickel catalysts, iron catalysts and/or nickel/iron catalysts, on a suitable substrate, as well as catalysts selected from the group consisting of ruthenium, platinum, nickel, cobalt, mixtures thereof.

In accordance with certain aspects of the present disclosure, the catalysts suitable for use with the processes described herein include those containing one or more metals or combinations of metals of Group Va, VIa, VIII, and the Rare Earth series of the Periodic Table, as described and referenced in "Advanced Inorganic Chemistry, $6^{th}$ Ed." by F. A. Cotton, et al. [Wiley-Interscience, 1999], any of which can be present on a suitable, conventional inorganic support material. The preferred catalysts for use with the processes described herein include, but are not limited to, those containing one or more of the metals selected from the group consisting of cobalt, titanium, iron, chromium, vanadium, nickel, tungsten, germanium, zinc, cerium, and antimony, as well as combinations of two or more of these metals, such as in cobalt-molybdate (Co—Mo) catalysts. In the event that the catalyst used in the processes of the present disclosure is a mixture of two metals, the ratio (on an atomic basis) of these metals is preferably between about 10:90 and 97.5:2.5, and more particularly ranges from about 25:75 to about 95:5, including ratios between these values, such as about 50:50.

Suitable supports for use in accordance with the catalysts and catalyst systems useful in the processes of the present disclosure include ceramic materials, sintered metals, oxides, activated alumina or alumina-based materials, and silica gel, as well as mixtures thereof, such as alumina mixed with one or more other oxides. Suitable oxides include silica, titanium oxide, zirconium oxide, cerium oxide, tin oxide, trivalent rare-earth oxides, molybdenum oxide, cobalt oxide, nickel oxide, iron oxide, and the like. Activated alumina or alumina-based materials suitable for use herein include hydrated alumina compounds such as hydrargillite, bayerite, boehmite, pseudoboehmite, and amorphous or substantially amorphous alumina gels. Exemplary alumina and alumina-based materials include aluminas which contain at least one of the phases taken from the group consisting of alpha, beta, delta, theta, kappa, gamma, eta, chi, rho, and mixtures thereof, as well as aluminas obtained by methods such as precipitation, rapid dehydration of aluminum hydroxides or oxyhydroxides, and/or calcining processes.

In accordance with aspects of the present disclosure, the catalysts and/or supports suitable for use with the process of FIGS. 1-2 typically have a specific surface area ranging from about 1 $m^2/g$ to greater than about 800 $m^2/g$, a mean pore diameter of the support of at least about 0.1 μm, and an average pore radius of about 20 Å or more. In this context, and within the framework of the present disclosure, the specific surface area is understood to be the BET surface area as defined by S. Brunauer, et al. [J. Am. Chem. Soc., Vol. 60; pp. 309 (1938)].

The catalysts of the present disclosure can further comprise a number of additives for improving their final chemical and/or mechanical properties. Such additives include inorganic constituents such as clays, silicates, ammonium sulfates, ceramic fibers, and asbestos; thickening agents; surface-active agents; flocculating agents; and pore-forming agents. Thickening agents include cellulose, carboxymethyl cellulose, carboxyethyl cellulose, tallol, and xanthan gums. Flocculating agents include polyacrylamides, carbon black, starches, stearic acid, polyacrylic alcohol, polyvinyl alcohol, biopolymers, glucose, polyethylene glycols, and the like.

Pore-forming agents include those agents that are added during preparation of the catalyst, but which disappear completely upon heating, thus creating the required macroporosity of the catalyst. Exemplary pore-forming compounds include, but are not limited to, wood flour, charcoal, sulfur, tars, plastics or plastic emulsions such as polyvinyl chloride, polyvinyl alcohols, naphthalene, and combinations thereof.

Additionally, the catalysts suitable for use in the processes of the present disclosure can be prepared by any known process for agglomerating, shaping or forming a catalyst or supported catalyst, including extrusion, pelleting/pelletization, granulation, and the like. Typically, the catalysts can be in any suitable shape, including beads, pellets, monoliths or agglomerates.

In some cases, environmental regulations will permit the discharge of the hot oxidized tail gas to the atmosphere. More commonly, the oxidized tail gas will be subsequently cooled by various conventional means such as, for example, indirect heat transfer to generate waste heat steam, followed by $SO_2$ recovery using various established processes.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intends to protect all such modifications and improvements to the full extent that such falls within the scope or range of equivalent of the following claims.

All of the compositions, methods, processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions, methods, processes and/or apparatus and in the steps or in the sequence of steps of the methods described herein without departing from the concept and scope of the invention. Further, it will be apparent that certain agents which are chemically related may be substituted for the agents described herein while the same or similar results would be achieved. All such similar substitutes and modifications apparent to those skilled in the art are deemed to be within the scope and concept of the invention.

What is claimed is:

1. A reductive method for the destruction of ammonia in a Claus tail gas treating unit, the method comprising:
   introducing an ammonia-containing gas stream into a first combustion zone of a reactor in combination with a first oxygen-containing air stream to generate a first combustion gas stream composition;
   introducing a hydrocarbon-containing fuel gas stream and a second oxygen-containing air stream into a second combustion zone of the reactor to generate a second combustion gas stream composition;
   combining the first and second combustion gas stream compositions in a waste heat boiler to generate a waste effluent gas;
   contacting the combined first and second combustion gas stream compositions with an ammonia cracking catalyst within the waste heat boiler to generate a waste effluent stream;
   contacting the waste effluent gas with a Claus tail gas stream to produce a primary waste stream; and
   contacting the primary waste stream with a hydrogenation catalyst system for a period of time sufficient to reduce $NO_x$ in the primary waste stream to ammonia.

2. The method of claim 1, wherein the ammonia cracking catalyst comprises a catalyst containing one or more metals or combinations of metals of Group Va, VIa, VIII, and the Rare Earth series of the Periodic Table.

3. The method of claim 2, wherein the catalyst contains one or more metals selected from the group consisting of cobalt, titanium, iron, chromium, vanadium, nickel, tungsten, germanium, zinc, cerium, antimony, and combinations of two or more of these metals.

* * * * *